United States Patent Office 3,522,089
Patented July 28, 1970

3,522,089
METHOD OF PREPARING INSULATED ELECTRIC WIRES COATED WITH FOAMED SYNTHETIC RESIN
Toshihisa Takada, Sakura-shi, Hisao Ishikawa, Setagaya-ku, Tokyo, Keishi Tado, Ichikawa-shi, and Yukio Matsui, Chiba-shi, Japan, assignors to The Fujikisa Cable Works, Ltd., Koto-ku, Tokyo, Japan, a corporation of Japan
No Drawing. Filed May 1, 1967, Ser. No. 634,913
Claims priority, application Japan, May 4, 1966, 41/28,166; Sept. 5, 1966, 41/58,830; Apr. 14, 1967, 42/23,379
Int. Cl. B44d 1/36, 1/44; H01b 3/30
U.S. Cl. 117—232      2 Claims

ABSTRACT OF THE DISCLOSURE

A method of preparing insulated electric wires coated with foamed synthetic resin comprising dissolving crystalline synthetic resin powders in relatively small quantities of solvent for the resin, coating the resin solution obtained on a bare conductor, cooling the resin solution so as to whiten it and then heating the whitened resin solution layer to foam the layer due to the evaporation of the solvent contained therein.

BACKGROUND OF THE INVENTION

This invention relates to improvements on a method of preparing insulated electric wires coated with foamed synthetic resin, and particularly, to improvements whereby the ratio of the solvent to the resin in the preparation of a synthetic resin solution to be coated on a bare conductor is reduced, thus saving the amount of solvent used and also making possible the formation of uniform foamed synthetic resin coatings.

In recent years, insulated electric wires coated with foamed synthetic resin have been extensively used as the core wires of communication cables, particularly those for city telephone networks for reduction in the cable diameter. Clad with insulation layers which have a small dielectric constant due to porosity, such insulated electric wires, even when thinly coated with said insulation layers, have characteristics equal to, or higher than, those of the insulated wires coated with nonporous insulation layers.

Such insulated electric wires with foamed thin insulation are manufactured generally in the following manner. First, crystalline synthetic resin raw material with excellent mechanical and electric properties such, for example, as high-density polyethylene or polypropylene is charged into a dissolution tank with an organic solvent for thermal dissolution. The resin solution obtained is transferred first to a storage tank and then to a coating tank. The resin solution is circulated between the storage tank and the coating tank in order to keep its concentration constant and is coated in the coating tank on a bare conductor introduced therein.

The resin solution coated on the conductor is then dried to remove excess solvent except for that required in foaming process. At the same time the solution is cooled to below its clouding point and then heat is applied for foaming.

In the foregoing process, it is inevitably required that the solution is stirred in the dissolution tank and circulated between the storage and coating tanks, so that the solution should have sufficiently high fluidity to permit these operations. Accordingly, the viscosity of the resin solution should preferably be below 3,000 poises, thus the amounts of the solvent required should be 2.3 times or more that of the resin by weight.

Even with such a large amount of solvent, the uniform dissolution of resin by a process involving the rotation of stirring blades, usually with heat, requires agitation of more than 4 hours. Consequently to make up the resin solution according to its consumption in the coating tank, it is necessary to dissolve a great deal of resin in a large dissolution tank and also provide a large storage tank to hold considerable amounts of said solution. When the resin solution is transferred from the dissolution tank to the storage tank, fresh resin and solvent are charged into the dissolution tank and the aforementioned dissolving operation is repeated. Prior to this operation, the dissolution tank and the circulation system are cleaned so as to avoid any contamination of the solution prepared in the next operation.

Using large amounts of solvent relative to the resin is accompanied with various disadvantages in addition to economic drawbacks such as waste of the solvent. The resin solution containing solvent which has been applied on the conductor is dried in order to reduce the solvent content to an extent adapted to ensure good clouding. However, the removal of excess solvent by such drying tends to be performed locally and unevenly. Thus the solvent proportions in the resin solution vary, resulting in nonuniform foamings. Such irregular foamings will naturally have harmful effects on the quality of the insulated electric wire produced.

SUMMARY OF THE INVENTION

This invention provides a method of manufacturing insulated electric wires coated with foamed synthetic resin which comprises the steps of previously dispersing crystalline synthetic resin powders in a solvent for said resin, heating the suspension so as to dissolve the resin particles dispersed therein in said solvent, coating the resin solution obtained on a bare conductor, cooling the resin solution to whiten it due to the crystallization of the resin and the nucleation of the foam in the resin layer, and then heating the whitened resin layer for foaming due to the melt of the crystals and the growth of the nuclei contained therein.

Accordingly, an object of this invention is to provide a method which comprises dissolving powdered crystalline synthetic resins in relatively small amounts of solvent, feeding the resin solution obtained continuously to the application mechanism for the coating of bare conductors, thereby efficiently manufacturing insulated electric wires coated with foamed resin.

Another object of this invention is to provide a method which makes possible the uniform dissolution of resin powders in relatively small quantities of solvent and also savings on the amounts of solvent used and the formation of uniformly foamed insulation layers on the conductor.

A further object of this invention is to provide a method of manufacturing insulated electric wires coated with foamed synthetic resin, whereby reduction in the size of the required apparatus, reduction in processing time and also the adaption of continuous operation are made possible.

A still further object of this invention is to provide a method of manufacturing insulated electric wires coated with synthetic resin, in which the residual solvent content in the foamed synthetic resin insulation layers formed on the conductor is reduced, thereby solving such problems as decreases in the diameter of insulated electric wires after manufacture due to the evaporation of the solvent content thereof and the consequential loosening of the windings.

DESCRIPTION OF THE PREFERRED EMBODIMENTS

The raw resins used in the process of this invention consist of crystalline synthetic resins in powders. After being uniformly dispersed in the solvent, the powders are dissolved in said solvent by mixing and heating. Therefore, even with small amounts of solvent relative to the resin, a homogeneous solution is quickly obtained. Since the resin solution can be prepared immediately as required, it is possible to reduce considerably the size of the apparatus for obtaining the resin solution.

The fact that only small amounts of solvents are required relative to that of the conventional method not only prevents wasteful consumption of the solvent, but also helps the formation of uniformly foamed synthetic resin insulation layers.

The crystalline synthetic resins such as low-density polyethylene, high-density polyethylene or polypropylene are employed in powders, more preferably fine particles of below 80 meshes. In this specification, the mesh sizes are given according to the table of Tyler's standard sieves.

The resin powders are first uniformly dispersed in the solvent. The most preferable amount of the solvent used lies in a range between 1 and 1.8 times the amount of the resin by weight. The suspension is then heated to dissolve the dispersed resin powders in the solvent. The resin powders, already uniformly in contact with the solvent, are dissolved very rapidly by heating.

Further, an important aspect of the present invention is that it enables the solvent requirements for the resin to be reduced to the minimum extent necessary for whitening and foaming. To accomplish expansion in degrees of 15 to 25 percent as usually demanded of insulation layers for electric wires, the resin should be dissolved in a solvent 1 to 1.8 times to the weight of the resin.

The resin solution containing a solvent in this range is whitened immediately upon cooling and requires no subsequent drying to remove the excess solvent content.

The heating of a solution containing uniformly dispersed resin powders for dissolution may be carried out in a hermetically sealed mixing device to prevent the escape of the solvent. The most suitable mixing device is a screw extruder or a screw mixer, such devices are suitable to prepare a resin solution which includes lower proportion of the solvent and has relatively high viscosity. Of these mixers, the screw extruder in particular is of greater advantage in that it permits the suspension to be continuously heated and conducted to the application device.

The resin can be rapidly dissolved when the heating temperature of the dispersed solution is close to the boiling point of the solvent contained in the mixing device, for example, when it is about 10° C. below said boiling point. Heating beyond the boiling point of the solvent would bring about extremely increased pressure in the mixing mechanism. This would make it necessary to give consideration to make the mixing mechanism withstand such increased pressure and would also probably cause the solvent to segregate in the dispersed solution due to its evaporation.

The resin dissolved in the solvent is coated in the subsequent coating mechanism on a bare conductor to the desired thickness so as to cover it entirely. The coating operation may be performed by passing the bare conductor through an appropriate die in order to regulate the thickness and cross sectional shape of the resin solution deposited around said conductor while it is carried through the solution. Alternatively, the coating operation may be carried out by introducing the resin solution into the screw extruder cross head under adequate pressure and passing the bare conductor through said head. In this case it is preferable to introduce the resin solution into the cross head at a pressure ranging from 1,000 to 50,000 g./cm.$^2$. Under such conditions, the resin solution layers formed on the bare conductor will have a uniform thickness and it will be possible to move the conductor at an economically advantageous speed.

In the coating carried out in a cross head, when the temperature of the solution is between the boiling point of the solvent and the point showing a vapor pressure lower than the pressure applied on the solution, a time required for whitening of the resin solution to be carried out prior to forming process can be remarkably shortened. Under such thermal conditions, it is found that the solution may assume a condition capable of foaming in the following process even with cooling for short period of time. It is not clearly understood what changes occur in the solution, but it is considered that nuclei caused by evaporation of the solvent are produced in the resin solution at the afore-mentioned temperatures, and each of nuclei forms a cell when the solution is heated in the foaming process. Such nuclei may rapidly be produced when the solution is exposed to the atmosphere after coating on the bare conductor in the cross head.

The resin solution coated on the bare conductor is first cooled for whitening and then heated for foaming after it has been applied on the bare conductor, the resin solution is already almost or entirely relieved of any excess solvent to be removed. Thus due to a relatively high whitening point, the resin solution is uniformly whitened in short time. For this reason, if the resin solution should contain more solvent than is required for optimum whitening and foaming thereof, the amount of excess solvent to be removed by drying prior to whitening would be quite small. Therefore, removal of such amounts of solvent will cause no difficulties in accomplishing the uniform whitening of the resin solution used.

The resin solution thus whitened uniformly is naturally expanded uniformly by the heating process usually practised for similar foaming. The insulated electric wire obtained is coated with insulation layers free from surface creases or pores like those prepared by the conventional method. Consequently, the wire displays the desired electric and mechanical properties. Furthermore, the small solvent content of the resin solution enables the residual solvent content of the expanded or foamed insulation layers to be also reduced. Thus it is possible effectively to prevent reduction in the diameter of the coated wire due to the evaporation of the residual solvent which might occur when the wire has been taken up and also the consequential loosening of the windings.

The invention is further illustrated by the following examples in which all parts are by weight.

Example 1

One hundred parts of high-density polyethylene powders (average particle size: 100 meshes; density: 0.945; and average molecular weight: 70,000) were dispersed in 140 parts of xylene at a room temperature. The suspension thus obtained was conducted into an ordinary type of extruder for heating. The extruder had a cross head attached to the exhaust end thereof. The interior of said cross head and also of a cylinder 40 mm. in diameter was maintained at a temperature of 130° C. While being transferred through the cylinder toward the cross head, the suspension was mixed and heated by means of a screw installed in said cylinder and rotating at a speed of 50 r.p.m., and was then carried into the cross head at a pressure of about 10,000 g./cm.$^2$. Through the cross head was passed a bare conductor 0.4 mm. in diameter at a speed of 180 m./min. During the passage, the conductor surface was coated with the resin solution. The conductor thus coated was cooled by passing through a water tank about 0.5 meter long and further a drier where it was subjected to air jets at 60° C. for 5 seconds. The resin solution was heated by moving through a heating furnace about 5 meters long which was maintained at a temperature of about 500° C., to the extent that the solution was foamed due to the evaporation of the solvent.

The insulated wire obtained had a uniform insulation coating about 0.12 mm. thick and expanded about 17 percent. The residual solvent content of said insulation coating was only 3 percent on the basis of the weight of the coating.

Example 2

One hundred parts of the same resin powders as in Example 1 were dispersed in 120 parts of p-cumene. The suspension was heated in an extruder provided with a cylinder maintained at temperature of 150° C. In the cross head attached to the extruder end, the solution was applied at a pressure of 30,000 g./cm.$^2$ on a bare conductor 0.32 mm. in diameter which was moving through said cross head at a speed of 200 meters per minute.

The conductor thus coated passed through a drier where it was subjected for air jets at 65° C. for 5 seconds. After drying and whitening treatment, the coated conductor moved through a heating furnace 5 meters long and maintained at 500° C. so as to foam the resin solution applied.

On the conductor were formed insulation layers 0.09 mm. thick and 18 percent in degree of expansion. The surface of said layers was flat and smooth and was not observed to contain any creases or pores.

Example 3

One hundred parts of polypropylene powders (average particle size: 120 meshes; and average molecular weight: 200,000) were dispersed in 130 parts of decaline. The suspension was heated to 150 to 160° C. in the same extruder cylinder as in Example 1. It was introduced into a cross head attached to the extruder end at a pressure of 40,000 g./cm.$^2$. The solution thus heated was applied in the cross head on a bare conductor 0.32 mm. in diameter passing therethrough at a speed of 220 meters per minute.

The conductor thus coated was passed through a drier where it was subjected to air jets at 60° C. for 6 seconds and thereby cooled for the whitening of the solution applied. Then the conductor moved through a heating furnace 5 meters long and maintained at 500° C. The insulation coating for the wire obtained was 0.08 mm. thick and contained about 15 percent of separated spherical cells, each about 20 microns in diameter. The residual solvent content of said insulation coating accounted for only 3 percent.

Example 4

One hundred parts of high-density polyethylene powders (average molecular weight being 7,000 to 8,000) were dispersed in 140 parts of xylene and dissolved at a temperature of 130° C. in an extruder. The solution was introduced into a cross head attached to the extruder at a pressure of 4000 g./cm.$^2$, and was then applied at a temperature of 150° C. in the cross head on a bare conductor 0.32 mm. in diameter passing therethrough at a speed of 250 meters per minute. The coated conductor was passed through an air bath maintained at a temperature of 60° C. for 2 seconds to cool the resin solution layer. The conductor thus cooled was then subjected to a foaming treatment as same condition as Example 1. The insulation layer formed on the conductor was 0.08 mm. thick and 18 percent in degree of expansion.

Example 5

One hundred parts of low density polyethylene powders (density: 0.920; average molecular weight: 30,000; and average particle size: 80 meshes) used as raw resin were uniformly dispersed in 130 parts of xylene solvent. The suspension was heated to about 130° C. in a screw extruder to dissolve the resin in the solvent. The solution was then conducted into a tank equipped with an application mechanism, where the solution was heated up to 150° C. at a pressure of 2,000 g./cm.$^2$ and a bare conductor 0.32 mm. in diameter was passed through it at a speed of 250 meters per minute. The conductor thus coated was cooled for the whitening of the resin solution applied by traveling through a drier where it was subjected to air jets at 60° C. for about 2 seconds. Then the conductor was heated for the expansion of the resin solution applied by moving through a heating furnace 5 meters long and maintained at 450° C. On the conductor were foamed insulation layers 0.085 mm. in thickness and 17 percent in degree of expansion. The surface of said layers was flat and smooth and was not observed to contain any creases or pores.

The invention may be embodied in other specific forms without departing from the spirit or essential characteristics thereof. The present examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for manufacturing an electric wire coated with an insulating layer of foamed synthetic resin which comprises the steps of:
    (a) dispersing crystalline synthetic resin particles having an average particle size of no greater than about 80 mesh in a solvent therefor to obtain a suspension, the amount of solvent being from about 1 to about 1.8 times the weight of the resin particles, and being less than the amount required to completely dissolve said resin particles;
    (b) passing the resulting suspension through a screw extruding zone;
    (c) extruding said suspension into a head zone disposed on the output side of said screw extruding zone while heating the suspension to a temperature sufficient to dissolve the resin particles in the solvent;
    (d) coating the resin solution on the electric wire by passing said wire through the cross head zone while maintaining a pressure of between about 1000 g./cm.$^2$ and 50,000 g./cm.$^2$ on said solution;
    (e) then cooling the coated layer to cause whitening of the applied coating; and
    (f) then heating the cooled layer to effect foaming of said layer.

2. A process according to claim 1 wherein said resin solution is coated on the wire at a temperature between the boiling point of the solvent contained in said resin solution and a temperature at which said solvent exhibits a vapor pressure lower than the pressure applied on the solution.

References Cited

UNITED STATES PATENTS 3,068,126   12/1962   Rokunohe et al. _____ 117—232
3,170,968   2/1965    Rokunohe et al. ____ 117—119.2

FOREIGN PATENTS 608,466   11/1960   Canada.

WILLIAM D. MARTIN, Primary Examiner

R. M. SPEER, Assistant Examiner

U.S. Cl. X.R.

117—119.2